United States Patent
Konop

(10) Patent No.: US 6,478,317 B2
(45) Date of Patent: *Nov. 12, 2002

(54) SWING-FRAME ASSEMBLY FOR TAG AXLE

(75) Inventor: Chad O. Konop, Appleton, WI (US)

(73) Assignee: McNeilus Truck and Manufacturing, Inc., Dodge Center, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/507,608

(22) Filed: Feb. 21, 2000

(65) Prior Publication Data

US 2002/0014754 A1 Feb. 7, 2002

(51) Int. Cl.[7] ............................................... B60G 11/26
(52) U.S. Cl. .................. 280/86.5; 280/81.1; 180/209
(58) Field of Search ........................ 280/86.5, 43.17, 280/81.1, 80.1, 81.6, 704, 85; 180/24.02, 209

(56) References Cited

U.S. PATENT DOCUMENTS

| | | | |
|---|---|---|---|
| 904,296 A | * 11/1908 | Bashford | 403/157 |
| 4,061,361 A | 12/1977 | Felburn | |
| 4,195,856 A | 4/1980 | Larson et al. | |
| 4,199,262 A | 4/1980 | Cribb et al. | |
| 4,314,709 A | 2/1982 | Silbernagel | |
| 4,421,331 A | 12/1983 | Ferris | |
| 4,501,437 A | 2/1985 | Becker | |
| 4,848,783 A | * 7/1989 | Christenson | 280/81.6 |
| 4,991,868 A | 2/1991 | VanDenberg | |
| 5,018,755 A | 5/1991 | McNeilus et al. | |
| 5,238,262 A | 8/1993 | Nunes | |
| 5,437,145 A | 8/1995 | Farley et al. | |
| 5,498,021 A | * 3/1996 | Christenson | 280/704 |
| 5,540,454 A | 7/1996 | VanDenberg et al. | |
| 5,597,174 A | 1/1997 | Christenson et al. | |
| 5,713,424 A | * 2/1998 | Christenson | 180/24.02 |
| 5,868,078 A | 2/1999 | Madison | |
| 5,897,123 A | 4/1999 | Cherney et al. | |
| 6,074,126 A | * 6/2000 | Hunter et al. | 403/157 |
| 6,116,698 A | * 9/2000 | Smith et al. | 280/86.5 |
| 6,135,469 A | * 10/2000 | Hulstein et al. | 280/86.5 |

FOREIGN PATENT DOCUMENTS

| | | |
|---|---|---|
| FR | 2 573 363 | 11/1985 |
| JP | 01301406 | 12/1989 |
| WO | WO 99/36279 | 7/1999 |

* cited by examiner

Primary Examiner—Brian L. Johnson
Assistant Examiner—Hau Phan
(74) Attorney, Agent, or Firm—Nikolai & Mersereau, P.A.; C. G. Mersereau

(57) ABSTRACT

A swing-frame auxiliary axle system for a work vehicle having a main frame including spaced chassis rails is disclosed which includes a pivot frame having a pair of spaced pivot arms connected by a common torque tube and each of which is pivotally mounted to a vehicle chassis rail, the spaced pivot arms including at least one tag axle and wheel and a cross member at the other end. An operating system is provided for moving the auxiliary axle assembly between a stowed and a support position. An independent modular arm pivot joint and attachment system pivotally mount each of the spaced pivot arms to a corresponding one chassis rails. The operating system also has a tag lever fixed to the torque tube and a hydraulic operating cylinder having a rod end journaled about an independent modular tag lever pivot joint and attachment system, connected between the rod end and the tag lever removably attaching the cylinder rod to operate the tag lever.

14 Claims, 9 Drawing Sheets

SWING-FRAME ASSEMBLY FOR TAG AXLE

BACKGROUND OF THE INVENTION

I. Field of the Invention

The present invention relates generally to swing-frame auxiliary axle systems for load-hauling vehicles and, more particularly, to a system for attaching and operating the swing frame of a stowable tag axle that includes separate modular, adjustable, attachment and pivoting systems, also adaptable to deal with a range of different spacings between the main longitudinal truck chassis members for mounting. The swing frame also includes an improved modular operating cylinder mount system which also facilitates assembly and disassembly of this aspect.

II. Related Art

Optionally deployable swing-frame auxiliary axle systems are well known and often associated with a variety of types of load-hauling vehicles, particularly those accustomed to time-varying loading, such as dump trucks, refuse collection vehicles and transit concrete mixers. Such vehicles typically include a chassis or frame, a cab and a dedicated truck body mounted on the chassis behind the cab. Such vehicles also include a forward steering axle placed near the front of the cab and one or more sets of drive axles spaced behind the steering axle, the drive axles often being provided in a dual axle arrangement. The auxiliary axle systems furnish additional load carrying capacity by adding an axle for assisting the steering and drive axles in supporting the load and in adjusting the inter-axle distance or increasing the overall front-to-rear axle span distance for the vehicle. In this manner, not only does the tag axle system assist in balancing the load carried by, for example, a transit mixing cement truck, but generally it also enables the truck to carry a higher legal total payload than would otherwise be permitted because weight restrictions placed on vehicles traveling over highways are typically measured in terms of load per axle in combination with overall spacing between the vehicle axles.

Examples of such auxiliary axle assemblies that can be selectively engaged with the ground are shown, for example, in U.S. Pat. Nos. 5,897,123 and 5,018,755. Thus, it is known to have tag axle systems generally consisting of a rear tubular cross member carrying spaced wheel assemblies and carried by a pair of spaced tag axle arms which, in turn, are pivotally mounted to the rear portion of a truck chassis according to a generally known arrangement. Linear reciprocating operating devices, typically hydraulic cylinders, or pneumatic devices are employed to pivot the tag axle system between a raised or stowed position and a lowered or ground-engaging position.

The pivotal mounts for swing frames of the class typically have involved a rather cumbersome system for mounting the spaced tag axle arms in some fashion from the main longitudinal chassis frame or rail members using a plurality of flange members which typically carry a pivot pin member journaled in bushing or bearings carried in a housing fixed to or integral with each of the pivot arms. The pivot block brackets are typically welded or bolted to the chassis member and each pivot pin is typically assembled into inner and outer pivot blocks which consist of two halves which are bolted together to retain the pin, each block having a semi-circular groove therein. Since the bearing surface housing is an integral part of each pivot arm, the blocks must be disassembled to release the tag swing arms and the entire swing arm assembly must be replaced if the bearing surface in the housing becomes worn. With these disadvantages, it would present a great advance if the pivot joints of the swing-frame tag axle assembly could be made more independent of that assembly and independent of the truck chassis so that easy removal and replacement of a separate worn assembly could be accomplished.

Likewise, the operating cylinder for the swing-frame auxiliary axle system is typically mounted from a tag lever welded to the cross tube connecting and extending between the spaced parallel arms near the point of attachment to the chassis. The upper portion of the pivot arm or tag lever is provided with a pivotal mount similar to those for the swing arms to which the rod end of an operating cylinder is attached using a bearing assembly attached to the operating rod and carried on a pivot pin or shaft which, in turn, is attached to the tag lever by being carried by a spaced split block system. As was the case with the swing arm pivot joints, the operating cylinder cannot be disconnected from the auxiliary axle assembly without disassembly of the pair of pillows for the pivot pin and the lower pivot blocks of the block assemblies are welded to and an integral part of the pillow swing-frame assembly so that, as a practical matter, replacement of these lower blocks cannot be accomplished without replacement of the entire pivot frame assembly. Although, in this case, the bearing surface itself is not carried by the auxiliary tag axle frame but by the cylinder rod.

Typical assemblies for the pivoting connectors of the spaced arms of a swing-frame assembly are shown in FIG. 6 of U.S. Pat. No. 5,897,123 and a typical assembly for connecting the operating cylinder to the swing-frame pivot assembly is shown in FIG. 10 of that patent. To any extent necessary, that reference is deemed incorporated herein by reference in its entirety.

As was the case in the swing-frame pivot assemblies, the pivot assembly for attaching the rod end of the operating cylinder to the swing frame would be advantageously advanced were it made independent of or readily removable from the swing-frame pivot assembly. This would allow removal, repair and replacement of the wear parts of the system to be readily made without affecting the integrity of the truck chassis or swing-frame assembly of the auxiliary axle system.

Accordingly, it is a primary object of the present invention to provide a swing-frame pivot tag axle assembly in which the swing frame itself contains no pivot wear parts.

A further object of the present invention is to provide a swing-frame assembly for a tag axle system for connection to the chassis of a load-hauling vehicle in which no pivotal wear parts are permanently attached to the chassis of the vehicle.

A still further object of the present invention is to provide removable and replaceable pivot joints for both the swing-frame pivot assemblies and the operating cylinder of a swing-frame tag axle frame assembly.

Yet another object of the present invention is to provide a swing-frame tag axle mounting system which can be utilized with chassis rails of different separations.

Further objects, advantages and novel features of the present invention will become apparent from the detailed description of the invention, taken in conjunction with the accompanying claims and drawings.

SUMMARY OF THE INVENTION

Aspects of the present invention solve many long-standing problems associated with the construction and maintenance of swing-frame pivot assemblies for tag axle systems. The present invention enables the pivot joints for the swing frame and associated operating cylinder to be constructed as independent units with respect to both the swing frame and the truck chassis rails so that removal and replacement of worn parts does not require repair or replacement of the pivot frame itself or affect the mounting of the frame to the chassis rails. In the detailed embodiment of the invention which illustrates the basic principles and advantages of the invention, each of the arms of the swing-frame pivot assembly is attached to an associated main frame rail utilizing an independent system which includes a structural channel member or pivot bracket which includes a segment which aligns and uses locking fasteners or bolts to attach through a corresponding frame rail and also contains a pivot bearing housing aspect which extends just beyond the end of the frame rail. A pivot pin is mounted to rotate within the pivot bearing housing riding on a pair of spaced, lowfriction bushings which fit into opposite ends of the hollow housing and are flanked by protective washers. The end of each swing-frame arm is provided with a dual forkshaped connector which has top and bottom forked flanges designed to slip over the pivot pin. Clevis members are also provided between the dual forks and the pivot pin and holes through these members align with a slotted opening in each end of the pivot pin so that lateral adjustment of the arm is accommodated. Each arm of the swing-frame pivot assembly then mounts to the pivot pin utilizing a pair of through bolts, the pivot pin being designed to rotate inside the bushings as the corresponding arm of the swing frame pivots. In this manner, when wear or corrosion of a pivot joint occurs, the arm of the swing frame can be removed by simply removing or, if necessary, cutting of f the corresponding attaching bolts and the assembly can be removed from the chassis by simply unbolting the pivot bracket from the corresponding frame rail or removing the locking fasteners. To this end, high performance locking fasteners such as those available from Huck International, Inc. Industrial Fastener Division in Waco, TX, and known as "Huck" fittings may be used to connect to the frame rails so that they will not loosen, but these can be easily removed when desired.

Independent construction is also utilized with regard to the attachment of the operating or pivoting cylinder to the swing-frame pivot tag lever assembly in accordance with the invention. The rod end of the operating cylinder associated with the swing-frame pivot assembly of the invention is threadably attached to a hollow bearing sleeve into which are pressed spaced, oppositely disposed bushing devices, each having a central bore designed to accommodate a pivot pin journaled therein. These may be the same as those used for the pivot arm connections. The corresponding upper end of the pivot or tag lever assembly, the base of which is attached to the common torque tube of the swing-frame assembly, is provided with a mounting base member having pairs of spaced bolt holes therein. A pair of spaced bearing blocks are mounted on top of the mounting base member using removable bolts and nuts. As with the other assemblies, Huck fittings may be used. A removable pin spans the spaced bearing blocks capturing the hollow bearing sleeve therebetween. A two-piece, but preferably one-piece slotted bearing blocks are employed which, when tightened in place, fix the pivot pin in position. In operation, then, as the cylinder rod is operated linearly to raise, lower and adjust the pressure on the deployed tag axle, the bearing sleeve rotates about the fixed pivot pin supported on the spaced bushings.

Here, as in the case of the swing-frame pivot arm connections, disassembly for maintenance and replacement of worn and corroded parts is relatively simply. The simple removal of four bolts, even if cutting be necessary, frees the cylinder from the tag axle assembly even if the parts of the pivot joint are frozen. Likewise, removal of the hollow bearing sleeve from the rod end of the cylinder requires only unscrewing of the sleeve from the cylinder rod.

In this manner, all the pivot joints associated with the mounting and operation of the swing-arm pivot assembly are constructed independent from the joined structures. This greatly facilitates repair and replacement of worn and damaged parts.

BRIEF DESCRIPTION OF THE DRAWINGS

In the drawings, wherein like numerals are utilized to designate like parts throughout the same.

DETAILED DESCRIPTION

In accordance with the detailed description of the present invention, the particular embodiments illustrated and described are meant to be illustrative of aspects of the invention concepts rather than limiting in any manner as it is believed that other structures may occur to those skilled in the art which remain well within the confines of those inventive concepts.

Figure 1:
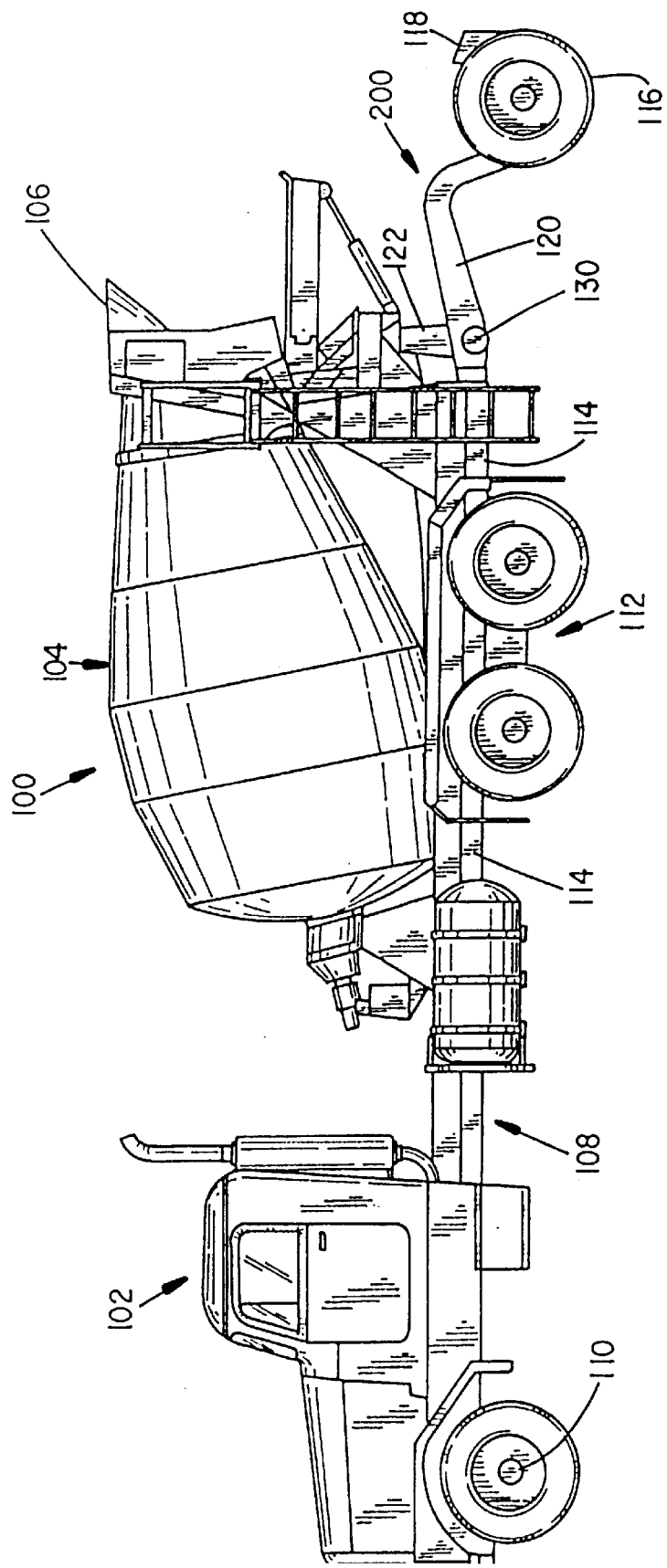
FIG. 1 is a side view of a transit concrete mixing work vehicle having a swing-frame auxiliary axle of a class suitable for use with the pivot assemblies of the present invention shown in a deployed position.

FIG. 1 shows a transit concrete mixing truck 100 having a cab 102 and a mixing drum 104 mounted behind the cab for receiving materials through a hopper 106, internally mixing concrete and dispensing same through the rear of the drum 104 in a well known manner. The vehicle further includes a chassis 108 on which the drum and the cab are mounted and which is provided with a steering axle 110 and a dual axle drive wheel arrangement 112. The vehicle chassis further includes a pair of spaced parallel main chassis members or frame rails, one of which is shown at 114, and which extend along the length of the work vehicle 100 and from which an auxiliary axle, generally 200, is pivotally mounted, as shown in greater detail in the ensuing FIGS. 2–6. The tag axle includes a pair of tag wheels as at 116 and a fender depicted at 118. One of the swing-frame arms is shown at 120 and a tag pivot arm at 122.

Figure 2:
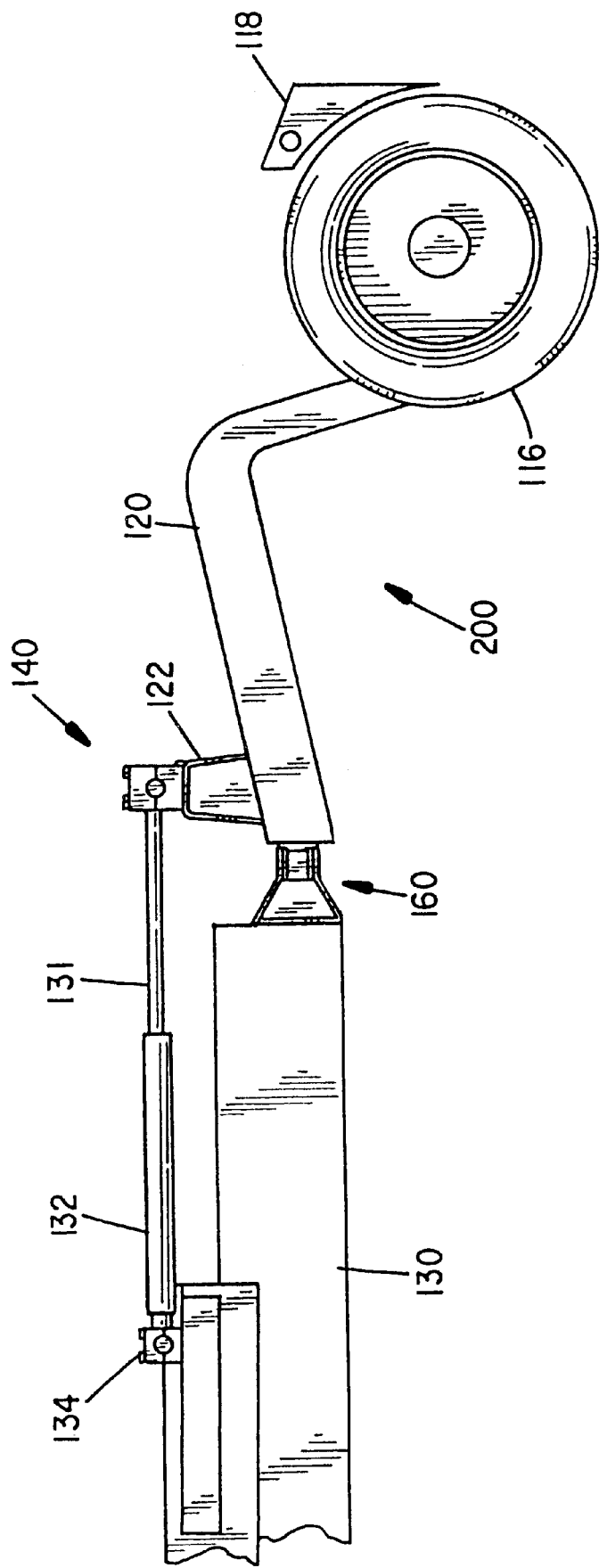
FIG. 2 depicts a side view of the auxiliary axle assembly depicted in FIG. 1.
Figure 3:
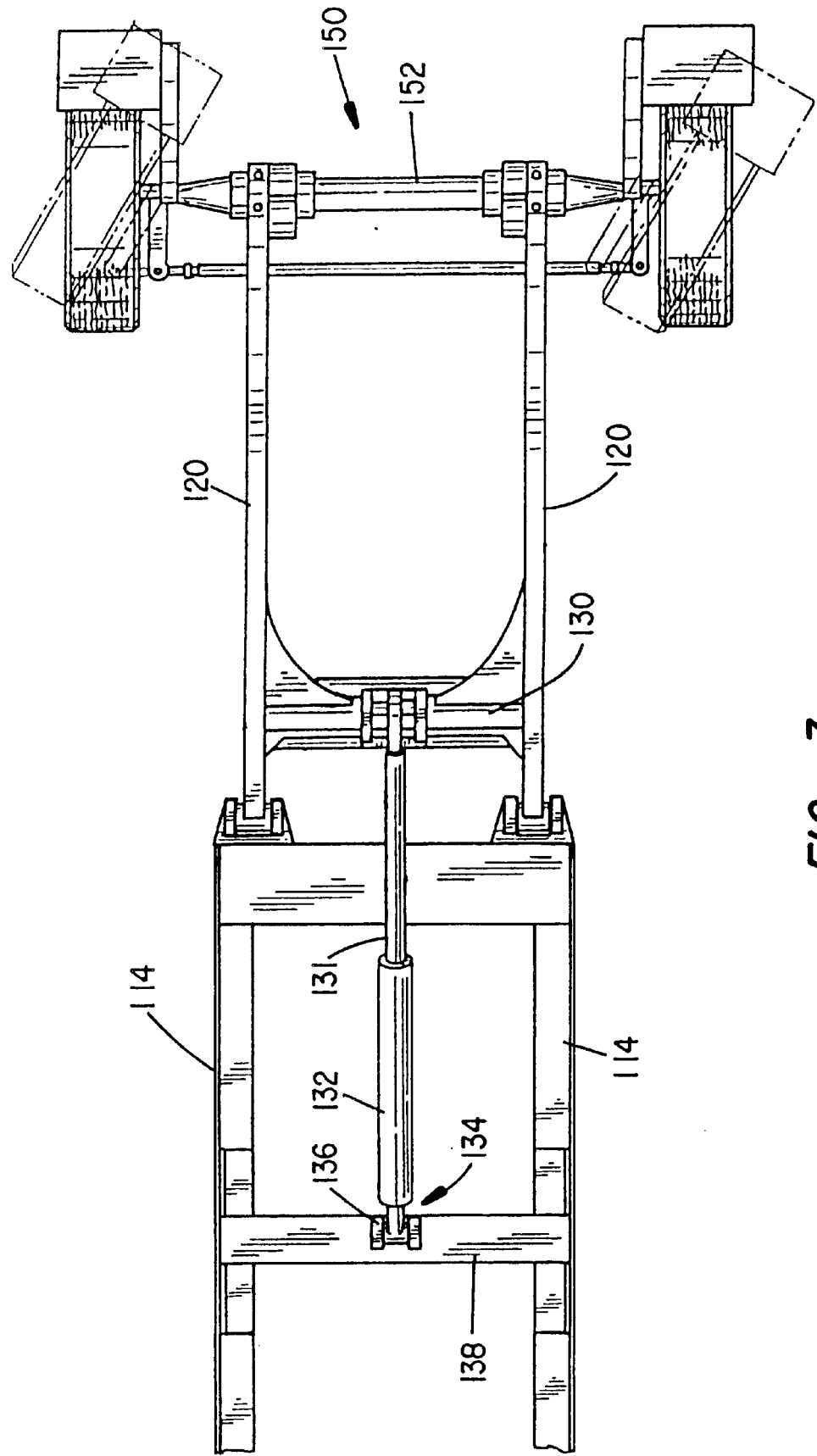
FIG. 3 is a top view of the auxiliary axle assembly of FIG. 2.
Figure 4:
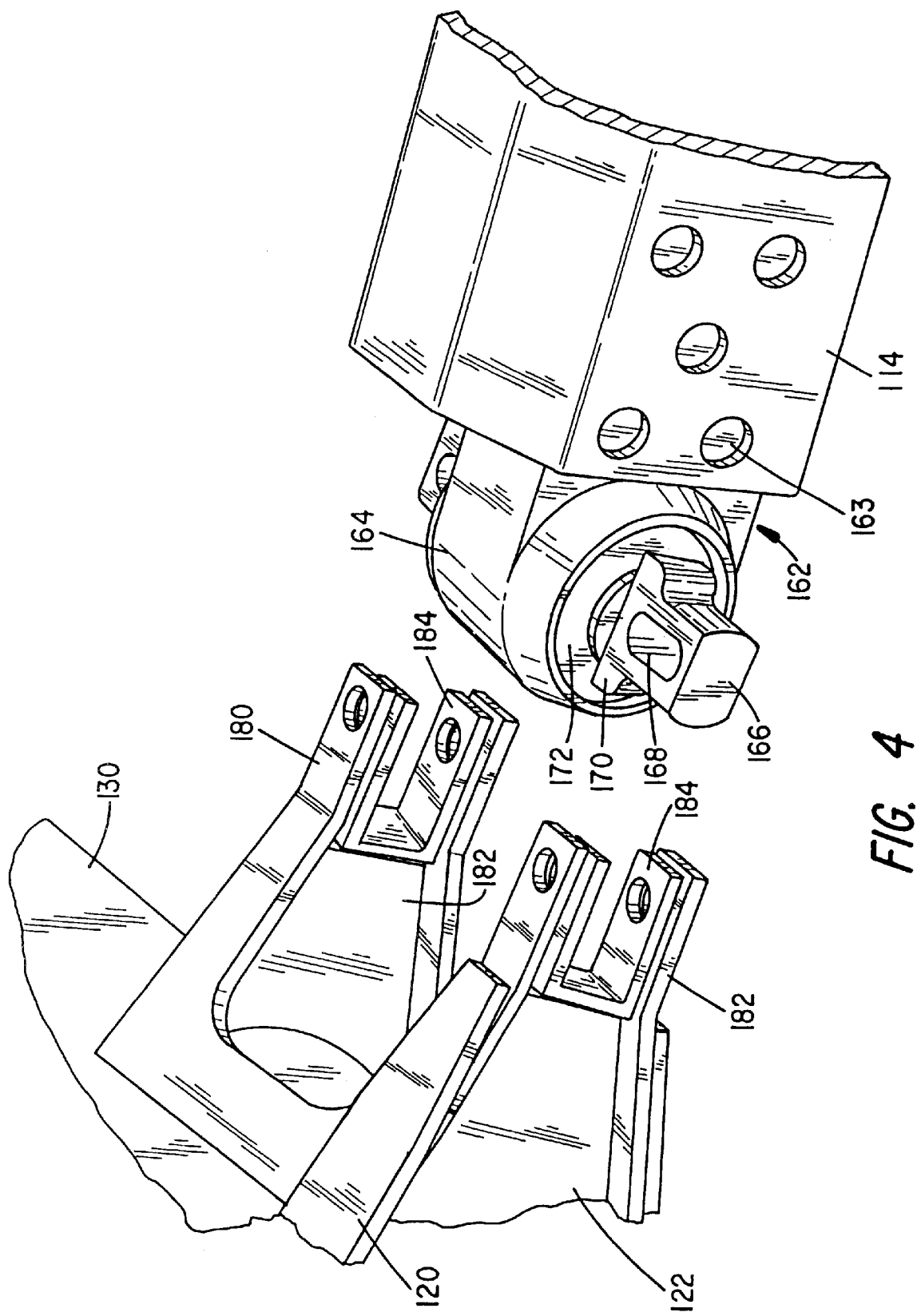
FIG. 4 is a greatly enlarged perspective, partially exploded view showing a swing-frame arm pivot joint in accordance with the invention.

FIGS. 2 and 3 depict a general structure of the auxiliary axle assembly 200, including the spaced parallel pivot arms 120 with connecting torque tube 130. Operating cylinder 132 with rod 131 is shown connected between the blocks of a rear assembly of the cylinder pivot joint of the invention shown generally at 140 and explained in greater detail in conjunction with FIGS. 7 and 8. The blind end of the cylinder 132 is also pivotally mounted as at 134 by a clevis arrangement including mounting flanges 136 fixed to chassis cross member 138. The system further includes a steerable auxiliary axle generally at 150 mounted at the rear-most end of the rearward extending spaced parallel arms 120. As previously indicated, the arms are joined by a common torque tube 130 and operated by a lever arm 122 which affixed to and extends upward from the tube 130 and supports the cylinder mounting pivot assembly of the invention. The arms 120 are pivotally mounted to the chassis members 114 by the pivot assemblies generally denoted by 160. Thus, in the greatly magnified views of FIGS. 4-6, we see the frame rail 114 provided with a pattern of holes 162 through which the structural pivot bracket 164 is attached as depicted in FIG. 6A at 166.

The attachment system for the swing frame includes spaced subsystems that address each of the chassis rails 114 and include attachment members connected to the pivot arms 120 and the torque tube 130. Each attachment subsystem associated with one of the pivot arms of the swing frame is best pictured in the greatly enlarged views of FIGS. 4–6 and a smaller view of FIG. 6A, it being further understood that the other of the spaced systems is an identical, opposed system that addresses the other chassis rail. Each system includes a pivot bracket 162 which further defines a bearing housing 164 at one end thereof and is designed to be fastened to a chassis rail 114 utilizing a plurality of bolt holes as at 163. Fastener bolts with locking Huck nuts 167 are depicted in FIG. 6A. The bearing housing 164 is designed to accommodate a pivot pin 166, having flattened end sections provided with slotted openings 168 near each end and a retaining hub 170 and which is designed to rotate in the bores of a pair of spaced bushings having resilient outer layers which are pressfit into the opposite ends of the housing 164, each bushing being provided with a sealing washer as at 172. The bushings themselves are further illustrated at 174 in FIG. 8, as will be discussed.

Figure 5:
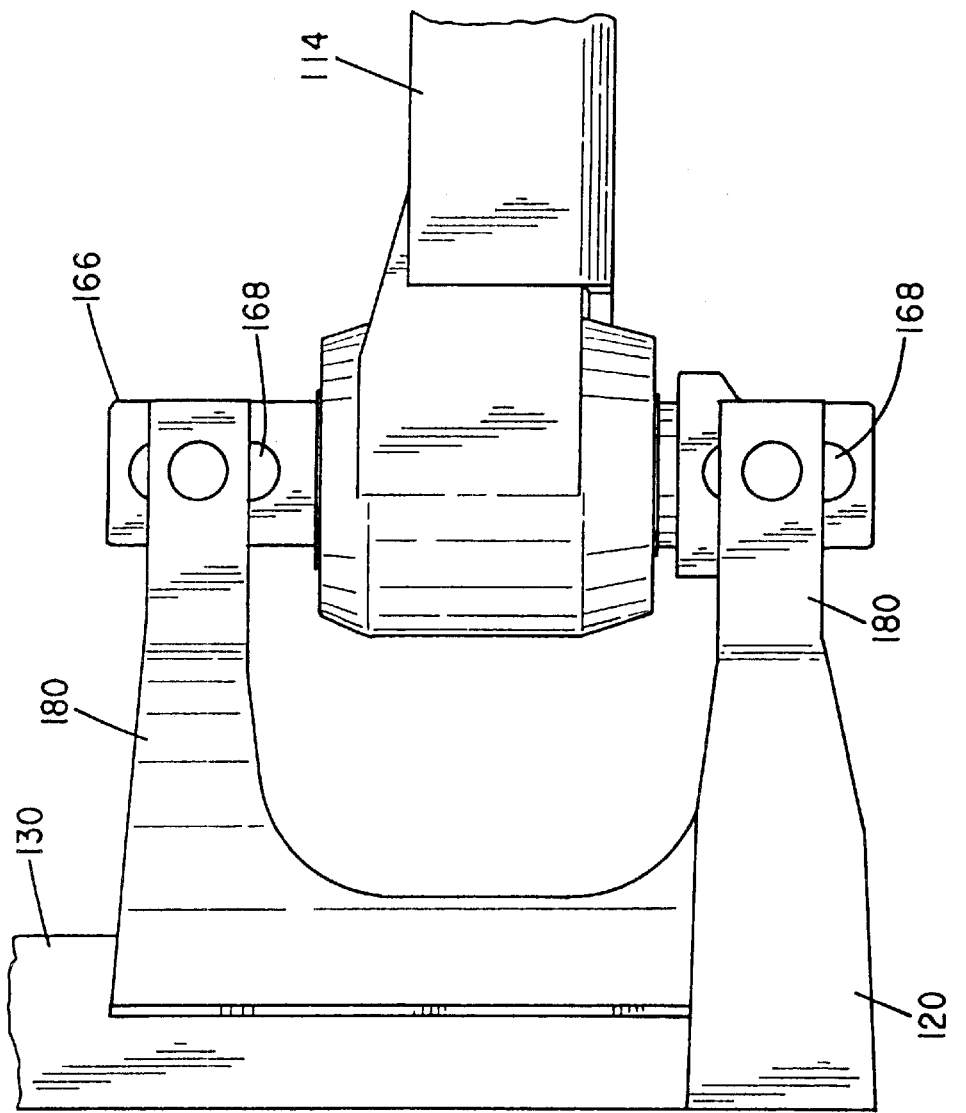
FIGS. 5 and 6 are perspective views showing the pivot joint of FIG. 4 assembled, but not bolted together.
Figure 6:
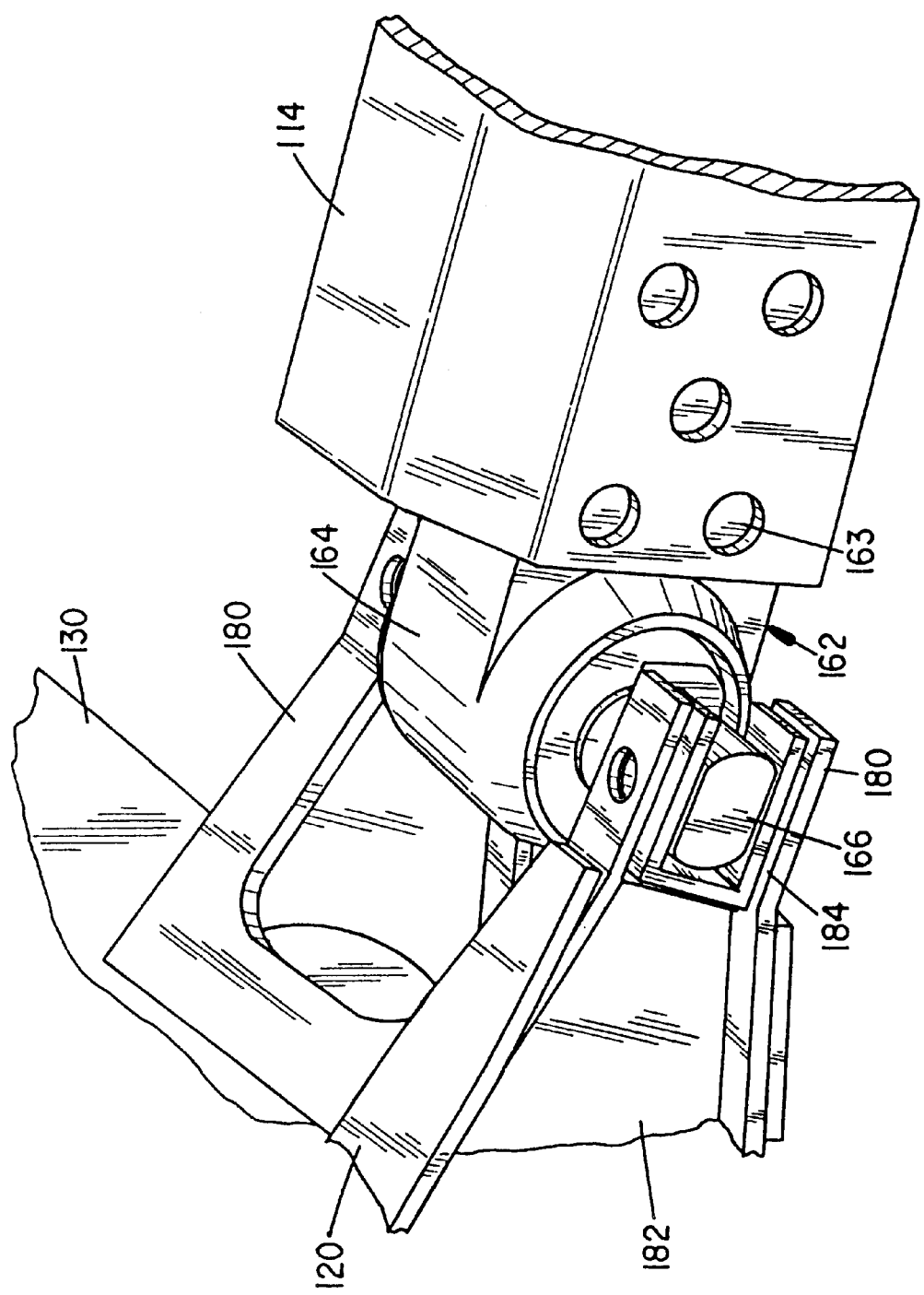
Figure 6A:
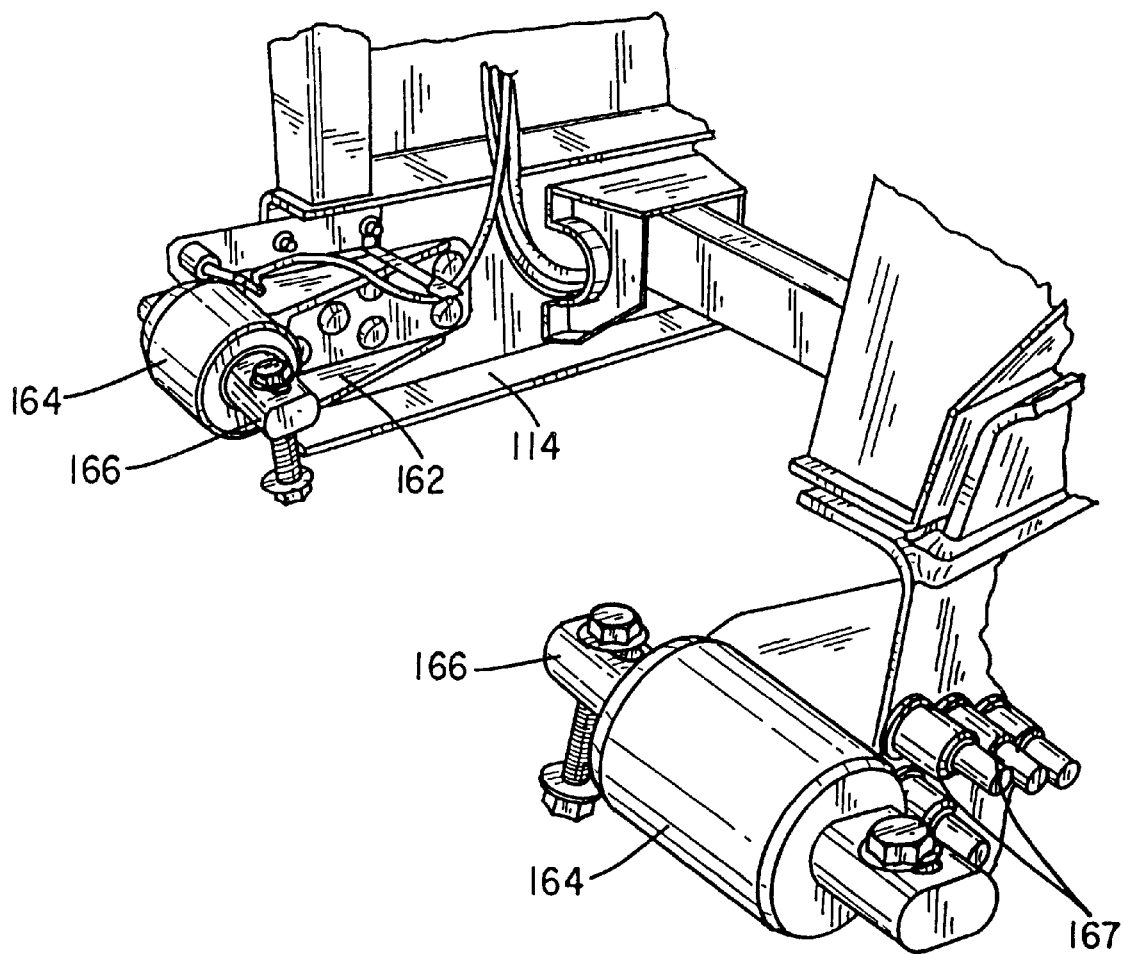
FIG. 6A is a broken perspective view which shows pivot joints connected to the chassis rails of a transit mixer.

Each pivot arm 120 is provided with a pair of spaced dual-prong connector shapes 180 with webs 182 are each provided with a corresponding inset clevis device at 184 designed to accommodate a flattened end of pin 166, shown in FIGS. 5 and 6 where they are bolted in place when assembled. The members 180 connect to the common torque tube 130. In this manner, the pivot connectors are independent of both the chassis rails 114, commonly structural channel members as illustrated, and the swing frame of the auxiliary axle system so that if the joint must be replaced, no cutting or repairs are necessary to either permanent frame structure. The dual arrangement is also shown in FIG. 6A which, as indicated, illustrates the connection of the pivot brackets 162 to the chassis members 114.

In this regard, an aspect which lends additional versatility to the invention lies in the use of the slotted openings 168 and the ends of the pins 166. Not only does this facilitate alignment of the tag axle pivot frame with the truck chassis, it also enables the tag axle pivot frame and connection system to accommodate chassis having varying inter-rail distances. Whereas most truck models are generally dimensionally close in this respect, there are sufficient differences to require some adjustment and this approach enables a single auxiliary axle pivot frame size to be accommodated on the chassis of a variety of vehicle manufacturers.

Figure 7:
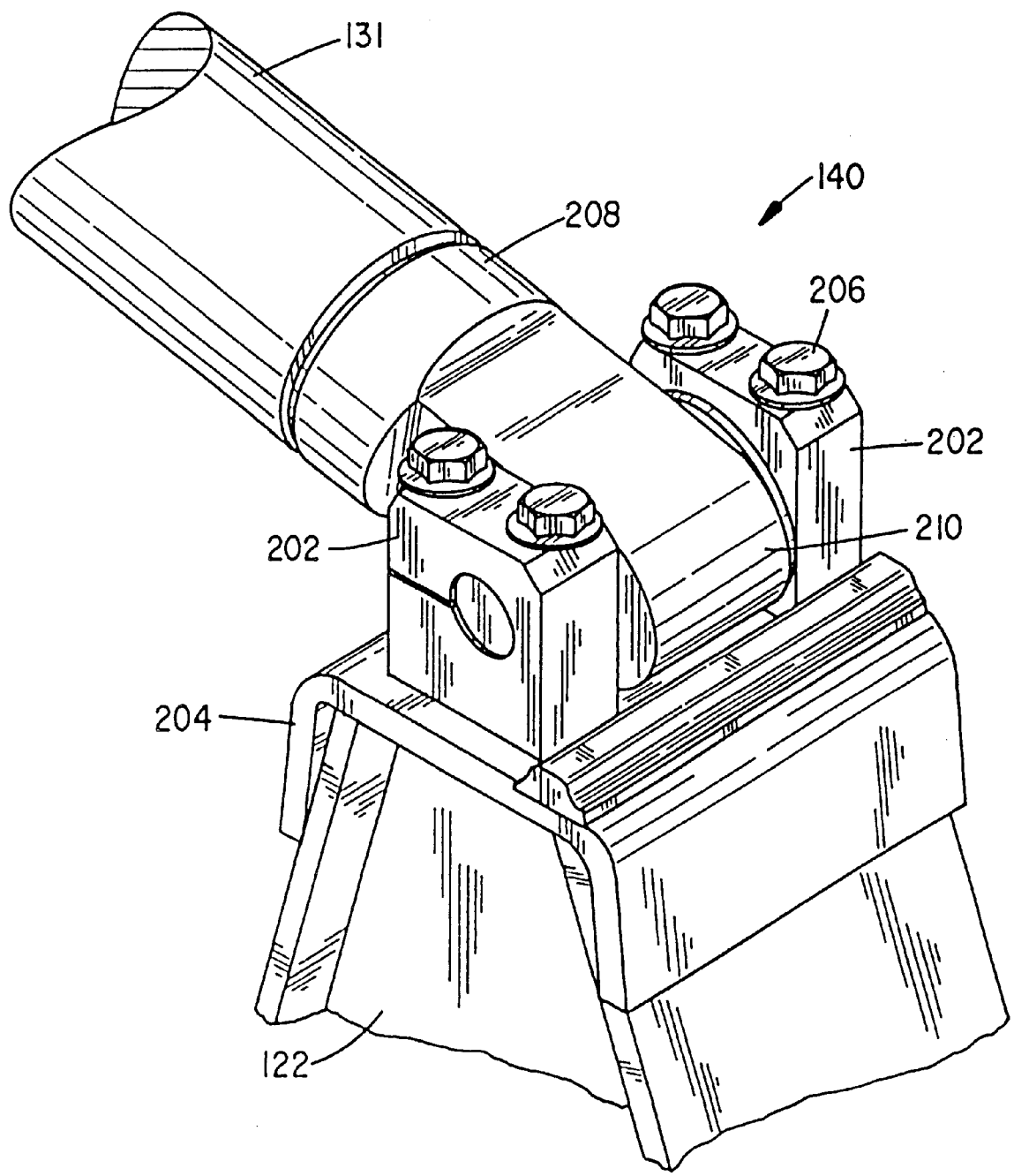
FIG. 7 is a greatly enlarged perspective view showing the cylinder pivot joint of the invention assembled on the pivot arm.
Figure 8:
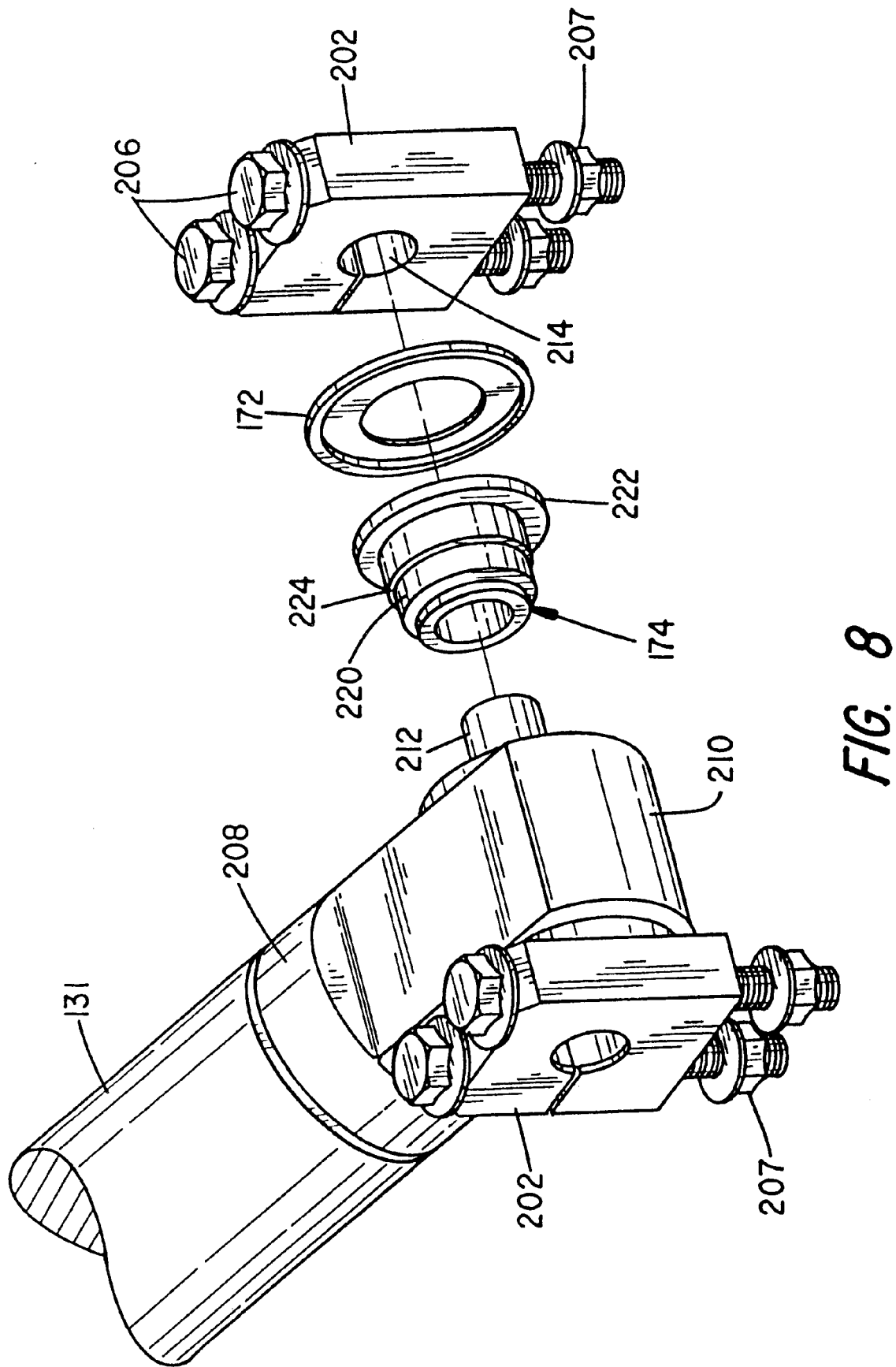
FIG. 8 is a partially exploded view of the pivot joint assembly of FIG. 7.

FIGS. 7 and 8 depict the connection of the rod end of the operating cylinder with the swing frame of the present invention. The system is shown generally at 140 in FIGS. 7 and 8 and includes a pair of spaced one-piece, side slit pillow blocks 202 which are bolted to a metal shape base 204 using bolts 206 and nuts 207. The shape 204 provides a base or upper surface to the pivot arm 122. The cylinder rod 131 is threadably attached to a shaped sleeve 208 which, in turn, also includes at the other end thereof a bearing housing 210 designed to accommodate a pair of oppositely disposed bushings 174 designed to be journaled on a common shaft or pivot pin 212 captured by the spaced pillow blocks 202 as it extends into openings 214. In this manner, the sleeve 208 with bearing housing 210 readily pivots about the mounting pin or shaft 212 as the pivot arm 122 is utilized in conjunction with the operation of the cylinder 132 to raise and lower the auxiliary axle assembly. Once again, a washer 172 is utilized between the bushing 174 and the pillow blocks 202 to assist in sealing the bushing from the incursion of debris and cleaning chemicals associated with the operation of the load-carrying vehicle.

It should be noted that the bushings 174 themselves are preferably multi-layered structures. (In this regard, possibly an exploded view showing the assembly of the bushing might be helpful.) The bushings include a somewhat resilient polymeric outer layer 220 which includes a larger diameter facing or flange 222 and one or more grooves 224. The material of the surface layer 220 is chemical resistant and somewhat resilient so that it may be inserted and retained in the inner surface of the hollow bearing sleeve as at 164 or 210 and, at the same time, provide additional cushioning in the operation of the system. The bushing further is provided with an inner perforated metallic layer which is coated with a polymeric low friction material such as Teflon which enables the bushing to rotate relative to the corresponding steel pivot shaft or pin. A further metallic layer is provided between the resilient outer surface layer and the inner low friction layer and space is provided to receive an inner resilient sealing device therebetween. The outer, flanged end of the bushing 174 is designed to accommodate the sealing washer 172.

According to aspects of the invention, then, a single auxiliary axle pivot frame is fabricated independent of both attaching and operating pivot devices. The tag axle pivot frame likewise is adaptable for attachment to spaced chassis rails of different spans and is readily attached using devices also independent of the chassis.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. A swing-frame auxiliary axle system for a work vehicle having a main frame including spaced chassis rails comprising:
   (a) an auxiliary axle assembly which includes a pivot frame having a pair of spaced pivot arms having two ends and being connected by a common torque tube close to one end thereof and each of which is pivotally mounted to a vehicle chassis rail, said spaced pivot arms including at least one tag axle and wheel and a cross member at the other end thereof;

(b) an operating system for pivoting said pivot arms thereby moving the auxiliary axle assembly between a stowed position in which the wheels are elevated and a support position in which the wheels engage the ground; and (c) an independent modular arm attachment and pivot joint unit for fastening each of said spaced pivot arms to a corresponding one of said chassis rails and including a pivot joint for said arm wherein each said attachment and pivot joint unit includes integral members with openings therein enabling it to be connected to and removed as a unitary structure from both the pivot arm and a chassis rail using removable fasteners, wherein each said attachment and pivot joint unit fastens one of said spaced pivot arms to said corresponding one of said chassis rails in a manner such that operational wear is limited to each said pivot joint of each removable unit; and wherein each said in independent modular arm attachment unit includes a pivot bracket removably fastened to the corresponding chassis frame rail and including an integral bearing sleeve with a pivot pin journaled therein, said pivot pin being further provided with spaced openings which are removably connected to the corresponding pivot arm.

2. The swing-frame auxiliary axle system of claim 1 including a slotted fastening arrangement to provide lateral leeway between the spaced pivot arms and the chassis rails to accommodate vehicle chassis having a range of rail spans.

3. The swing-frame auxiliary axle system of claim 1 including an arrangement for lateral connection between the spaced pivot arms and the chassis rails in the form of slotted openings in said pivot pins to accommodate vehicle chassis having a range of rail spans.

4. The swing-frame auxillary axle system of claim 1 further comprising oppositely disposed bushings in said bearing sleeve for carrying said pivot pin journaled therein.

5. The swing-frame auxiliary axle system of claim 4 further comprising means for laterally containing said pivot pin in said bearing sleeve.

6. The swing-frame auxiliary axle system of claim 1 wherein the work vehicle is a transit mixer.

7. A swing-frame auxiliary axle system as in claim 1 wherein said operating system for moving said auxiliary axle assembly is connected to said pivot frame by a removable pivot assembly unit.

8. A swing-frame auxiliary axle system as in claim 7 wherein said operating system further comprises a double-acting hydraulic cylinder.

9. A swing-frame auxiliary axle system for a work vehicle having a main frame including spaced chassis rails comprising:

(a) an auxiliary axle assembly which includes a pivot frame having a pair of spaced pivot arms having two ends and being connected by a common torque tube close to one end thereof and each of which is pivotally mounted to a vehicle chassis rail, said spaced pivot arms including at least one tag axle and wheel and a cross member at the other end thereof;

(b) an operating system for moving the auxiliary axle assembly between a stowed position in which the wheels are elevated in a support position in which the wheels engage the ground;

(c) an independent modular arm attachment and pivot joint unit pivotally fastening each of said spaced pivot arms to a corresponding one of said chassis rails wherein each said attachment and pivot joint unit includes integral members with openings therein enabling it to be connected and removed as a unitary structure and to fasten one of said spaced pivot arms to said corresponding one of said chassis rails in a manner such that operational wear is limited to each said pivot joint of each removable unit; wherein each said in independent modular arm attachment unit includes a pivot bracket removably fastened to the corresponding chassis frame rail and including an integral bearing sleeve with a pivot pin journaled therein, said pivot pin being further provided with spaced openings which are removably connected to the corresponding pivot arm; and (d) wherein said operating system further comprises a tag lever fixed to said torque tube and wherein said operating system further comprises a hydraulic operating cylinder having a rod end and an independent modular tag lever pivot joint and attachment unit removably fastened between said rod end of said operating cylinder and said tag lever removably attaching said cylinder rod to said tag lever.

10. A swing-frame auxiliary axle system of claim 9 wherein said tag lever pivot joint includes a bearing sleeve removably attached to the end of said rod end of said cylinder and journaled about a pivot pin carried between spaced pillow blocks, said pillow blocks being removably attached to said tag lever.

11. The swing-frame auxiliary axle system of claim 10 further comprising oppositely disposed bushings in said bearing sleeve for carrying said pivot pin journaled therein.

12. The swing-frame auxiliary axle system of claim 10 further comprising means for laterally containing said pivot pin in said bearing sleeve.

13. The swing-frame auxiliary axle system of claim 10 wherein said pillow blocks are one-piece split blocks.

14. The swing-frame auxiliary axle system of claim 9 wherein the work vehicle is a transit mixer.

\* \* \* \* \*